US011762153B2

United States Patent
Chen et al.

(10) Patent No.: US 11,762,153 B2
(45) Date of Patent: Sep. 19, 2023

(54) RECEIVER OPTICAL ASSEMBLY AND ASSEMBLY METHOD THEREOF

(71) Applicant: InnoLight Technology (Suzhou) LTD., Jiangsu (CN)

(72) Inventors: Long Chen, Jiangsu (CN); Dengqun Yu, Jiangsu (CN); Yuzhou Sun, Jiangsu (CN)

(73) Assignee: INNOLIGHT TECHNOLOGY (SUZHOU) LTD., Suzhou (CN)

( * ) Notice: Subject to any disclaimer, the term of this patent is extended or adjusted under 35 U.S.C. 154(b) by 45 days.

(21) Appl. No.: 17/399,182

(22) Filed: Aug. 11, 2021

(65) Prior Publication Data
US 2021/0373258 A1 Dec. 2, 2021

Related U.S. Application Data (63) Continuation of application No. 16/665,311, filed on Oct. 28, 2019, now Pat. No. 11,119,286.

(30) Foreign Application Priority Data

Oct. 29, 2018 (CN) .......................... 201811269497.1

(51) Int. Cl.
G02B 6/42 (2006.01)
G02B 6/43 (2006.01)

(52) U.S. Cl.
CPC ......... G02B 6/4214 (2013.01); G02B 6/4204 (2013.01); G02B 6/428 (2013.01);
(Continued)

(58) Field of Classification Search
None
See application file for complete search history.

(56) References Cited

U.S. PATENT DOCUMENTS

2013/0148970 A1 6/2013 Nakajima et al.
2014/0112618 A1 4/2014 Chang et al.
(Continued)

FOREIGN PATENT DOCUMENTS

CN 103852831 A 6/2014
CN 103926660 A 7/2014
(Continued)

Primary Examiner — Michelle R Connelly
(74) Attorney, Agent, or Firm — Finnegan, Henderson Farabow, Garrett & Dunner, LLP (57) ABSTRACT

A receiver optical assembly includes: an optical platform, a receiver optical port and a wavelength division multiplexer being arranged along an optical path on the optical platform; a circuit board, a photodetector array being disposed on the circuit board; a mounting block, a focusing lens and an optical path shifter being disposed on t the mounting block, the mounting block being fixed on the circuit board, and the optical path shifter being placed above the photodetector array. Incident light containing a multi-channel optical signal enters through the receiver optical port, and the wavelength division multiplexer divides the incident light into a plurality of single-channel optical signal beams. The single-channel optical signal beams are coupled to photodetectors on the photodetector array after passing through the focusing lens and the optical path shifter on the mounting block.

10 Claims, 4 Drawing Sheets (52) U.S. Cl.
CPC ......... *G02B 6/4215* (2013.01); *G02B 6/4244* (2013.01); *G02B 6/4245* (2013.01); *G02B 6/4246* (2013.01); *G02B 6/43* (2013.01)

(56) References Cited

U.S. PATENT DOCUMENTS

| | | |
|---|---|---|
| 2014/0133871 A1 | 5/2014 | Iemura et al. |
| 2014/0169389 A1 | 6/2014 | Kim et al. |
| 2014/0263970 A1 | 9/2014 | Heimbuch et al. |
| 2014/0270811 A1 | 9/2014 | Park et al. |
| 2015/0293316 A1 | 10/2015 | Sun et al. |
| 2017/0168252 A1* | 6/2017 | Pezeshki ................ H04B 10/40 |
| 2018/0172929 A1* | 6/2018 | Hu ......................... G02B 6/425 |
| 2018/0340820 A1 | 11/2018 | Iemura et al. |
| 2019/0302381 A1 | 10/2019 | Iemura et al. |
| 2019/0317284 A1* | 10/2019 | Matsuoka ............ G02B 6/4214 |

FOREIGN PATENT DOCUMENTS

| | | |
|---|---|---|
| CN | 103163605 B | 8/2016 |
| CN | 107046444 A | 8/2017 |

\* cited by examiner

RECEIVER OPTICAL ASSEMBLY AND ASSEMBLY METHOD THEREOF

CROSS-REFERENCE TO RELATED APPLICATION

This application is a continuation of application Ser. No. 16/665,311, filed Oct. 28, 2019 (allowed), which is based upon and claims priority to Chinese Patent Application No. 201811269497.1, filed on Oct. 29, 2018, the entire content of all of which are incorporated herein by reference.

FIELD OF THE DISCLOSURE

The present disclosure relates to the field of optical communication technology and, more particularly, to a receiver optical assembly and assembly method thereof.

BACKGROUND

As the market places increasingly higher demands on the volume of information and the speed of information transmission, the transmission speed of optical communication products also increases. However, in order to lower a device's capacitance so as to improve the performance of its high frequency response, the effective light receiving area (photosensitive area) of a photodetector (photodiode), which is an important component in a receiver optical assembly, is made increasingly smaller. As the effective light receiving area of a photodetector becomes smaller, the light energy received needs to be more concentrated in order to effectively converge on a detector assembly, and, at the same time, higher requirements are also imposed on the assembly tolerance of the device—the tighter the tolerance, the better. This imposes higher requirements on subsequent production and assembly.

SUMMARY

Purposes of the present disclosure include providing a receiver optical assembly and assembly method thereof that feature high operability, convenient coupling, effectively improved assembly efficiency, and increased degree of assembly tolerance.

In order to achieve one of the aforementioned purposes, one embodiment of the present disclosure provides a receiver optical assembly. The receiver optical assembly includes: an optical platform, a receiver optical port and a wavelength division multiplexer being arranged along an optical path on the optical platform; a circuit board, a photodetector array being disposed on the circuit board; and a mounting block, a focusing lens and an optical path shifter being disposed on the mounting block, the mounting block being fixed on the circuit board, and the optical path shifter being placed above the photodetector array. Incident light containing a multi-channel optical signal enters through the receiver optical port and the wavelength division multiplexer divides the incident light into a plurality of single-channel optical signal beams. The single-channel optical signal beams are coupled to photodetectors on the photodetector array after passing through the focusing lens and the optical path shifter on the mounting block.

Another embodiment of the present disclosure provides an assembly method for a receiver optical assembly. The method includes: installing a receiver optical port and a wavelength division multiplexer on an optical platform to form a first assembly; installing a photodetector array on a circuit board to form a second assembly; installing a focusing lens and an optical path shifter on a mounting block to form a third assembly; installing the first assembly and second assembly inside a housing; covering the photodetector array with the third assembly and adjusting the position of the third assembly so that an optical signal outputted from the wavelength division multiplexer is coupled to the photodetector array; and fixing the third assembly on the circuit board.

DETAILED DESCRIPTION

The text below provides a detailed description of the present disclosure with reference to specific embodiments illustrated in the attached drawings. However, these embodiments do not limit the present disclosure; the scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions; therefore, the drawings in the present application are only for the purpose of illustrating the basic structure of the subject matter of the present application.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another part or layer or "connected to" another part or layer, it may be directly above the other part or layer or directly connected to the other part or layer, or there may be an intermediate component or layer.

Figure 1:
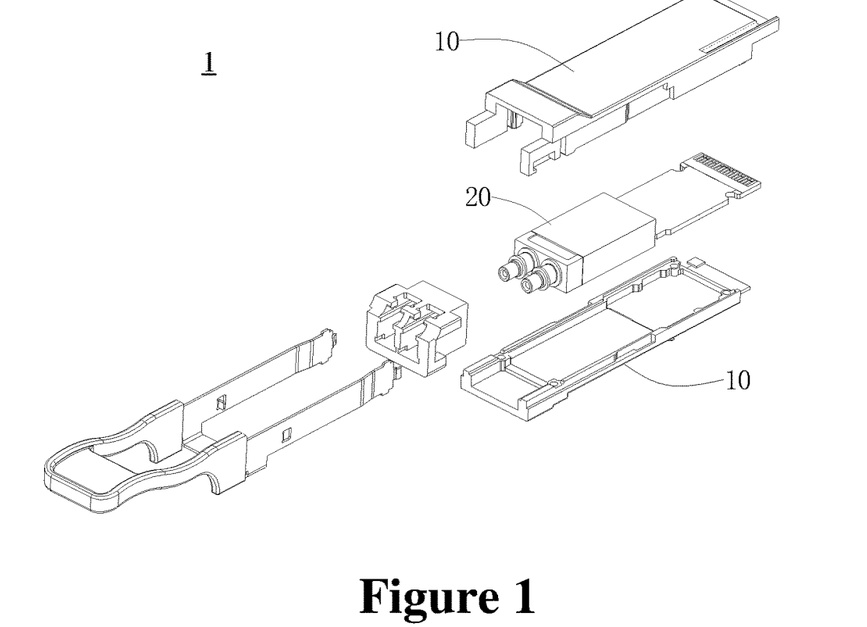
FIG. 1 is an exploded-view diagram illustrating an optical module.

FIG. 1 is an exploded-view diagram illustrating an optical module 1. As illustrated in FIG. 1, an optical module 1 generally includes a housing 10 and an optical assembly 20 disposed inside the housing 10. The present disclosure provides a solution for a receiver optical assembly at a receiving end of the optical assembly 20 inside the optical module 1.

Example Embodiment 1

Figure 2:
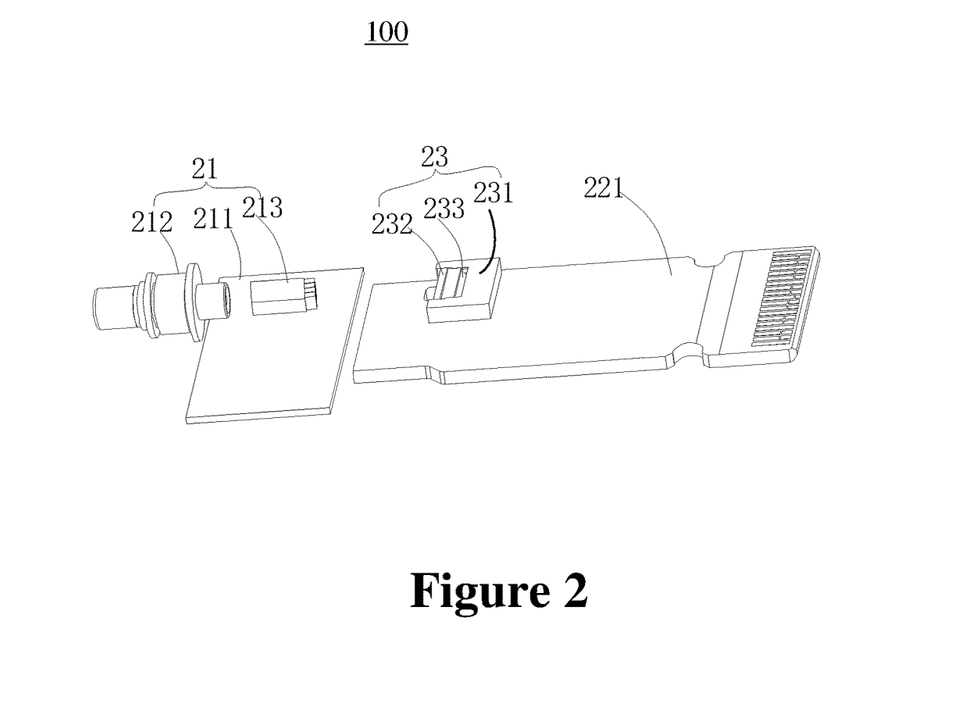
FIG. 2 is a structural diagram illustrating a receiver optical assembly according to a first embodiment of the present disclosure.
Figure 3:
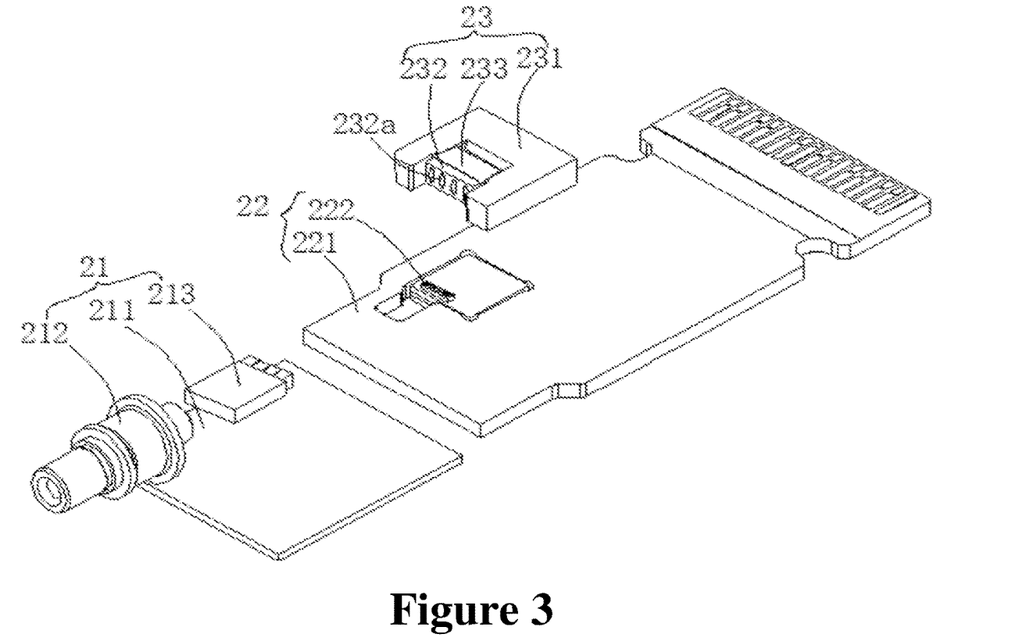
FIG. 3 is an exploded-view diagram illustrating part of the structure in FIG. 2.
Figure 4:
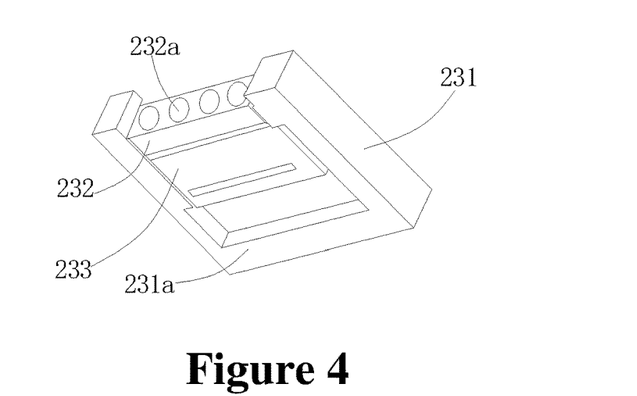
FIG. 4 is a diagram illustrating the installation of a focusing lens and an optical path shifter according to the first embodiment.
Figure 5:
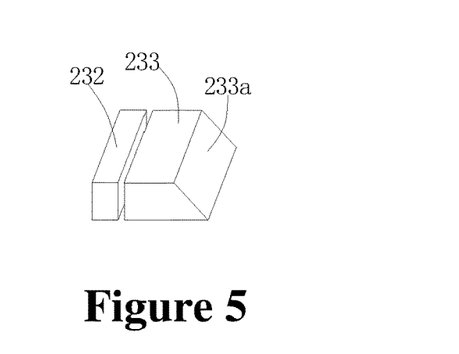
FIG. 5 is a structural diagram illustrating the focusing lens and the optical path shifter in FIG. 4.

FIG. 2 is a structural diagram illustrating a receiver optical assembly 100 according to a first embodiment of the present disclosure. FIG. 3 is an exploded-view diagram illustrating part of the structure in FIG. 2. FIG. 4 is a diagram illustrating an installation of a focusing lens and an optical path shifter according to the first embodiment. FIG. 5 is a structural diagram illustrating the focusing lens and the optical path shifter in FIG. 4. As illustrated in FIGS. 2 through 5, the receiver optical assembly 100 in this example embodiment includes, arranged along an optical path, a receiver optical port 212, a wavelength division multiplexer 213, a focusing lens 232, an optical path shifter 233, and a photodetector array 222, as well as a circuit board 221. Here, the receiver optical port 212 and the wavelength division multiplexer 213 are disposed on an optical platform 211, forming a first assembly 21; the photodetector array 222 is disposed on the circuit board 221, forming a second assembly 22; the focusing lens 232 and the optical path shifter 233 are disposed on a mounting block 231, forming a third assembly 23. In this example embodiment, the focusing lens 232 is disposed on the optical path before the optical path shifter 233. In another example embodiment, the focusing lens 232 may also be disposed on the optical path after the optical path shifter 233. The aforementioned mounting block 231 is fixed on the circuit board 221, placing the optical path shifter 233 above the photodetector array 222.

In this example embodiment, the mounting block 231 includes a supporting portion 231a. The mounting block 231 is fixed on the circuit board 221 by means of its supporting portion 231a to provide a clearance space that prevents the focusing lens 232 and the optical path shifter 233 from pressing down on the photodetector array 222 or other components below, and, at the same time, to form a coupling gap between the focusing lens 232 and the photodetector array 222. Here, the supporting portion 231a may have various shapes, e.g., a column shape or a frame shape, etc. The supporting portion 231a and the circuit board 221 may be fixed and connected by means of an adhesive, etc. When being coupled, front and back portions of the optical path are coupled by means of adjusting the position of the mounting block 231. When the position of the mounting block 231 is adjusted to an optimal coupling position, an adhesive layer may be used to conveniently fill in a space between a bottom of the supporting portion 231a of the mounting block 231 and the circuit board 221 so as to fix the mounting block 231 at the optimal coupling position.

During operation, incident light containing a multi-channel optical signal enters, through the aforementioned receiver optical port 212, the wavelength division multiplexer 213, which divides the incident light into a plurality of single-channel optical signal beams. The single-channel optical signal beams are then respectively coupled to photodetectors on the photodetector array 222 after passing through the focusing lens 232 and the optical path shifter 233 on the mounting block 231. In the present embodiment, the focusing lens 232 and the optical path shifter 233 are integrated to form an assembly, and the front and back portions of the optical path are coupled by means of adjusting this assembly, thus effectively improving coupling efficiency. At the same time, the mounting block 231 is added so that the position of the aforementioned assembly is conveniently adjusted by means of grasping the mounting block 231, thus increasing the operability of the coupling and assembly and effectively improving assembly efficiency.

As illustrated in FIGS. 3 through 5, in this example embodiment, the focusing lens 232 uses a structure formed by a plurality of coupling lenses 232a that are each positioned along the optical path of its respective single-channel optical signal beam. The coupling lenses 232a may be convex lenses, Fresnel lenses, aspheric lenses, GRIN lenses, etc., as needed. In the following example, a four-channel optical signal is discussed. Four single-channel optical signal beams are outputted from the wavelength division multiplexer 213 and directly enter, in parallel, the respective coupling lenses 232a of the focusing lens 232. After passing through the coupling lenses 232a, the four single-channel optical signal beams are still outputted in parallel to each other, and are respectively focused on the respective photodetectors in the photodetector array 222. In this structure, the gap between adjacent single-channel optical signal beams is relatively large, thus effectively reducing crosstalk between the channels of a high-speed signal.

In this example embodiment, the mounting block 231 includes a lens slot and a reflection slot. The focusing lens 232 is disposed in the lens slot, and the optical path shifter 233 is disposed in the reflection slot. As illustrated in FIG. 4 and FIG. 5, the coupling lenses 232a of the focusing lens 232 are formed as an integrated structure, and this structure and the optical path shifter 233 are installed separately on the mounting block 231. The optical path shifter 233 has a reflective surface 233a. The focusing lens 232 and the optical path shifter 233 may also be formed as an integrated single structure. Alternatively, the focusing lens 232, the optical path shifter 233, and the mounting block 231 may be made as an integrated structure.

Example Embodiment 2

Figure 6:
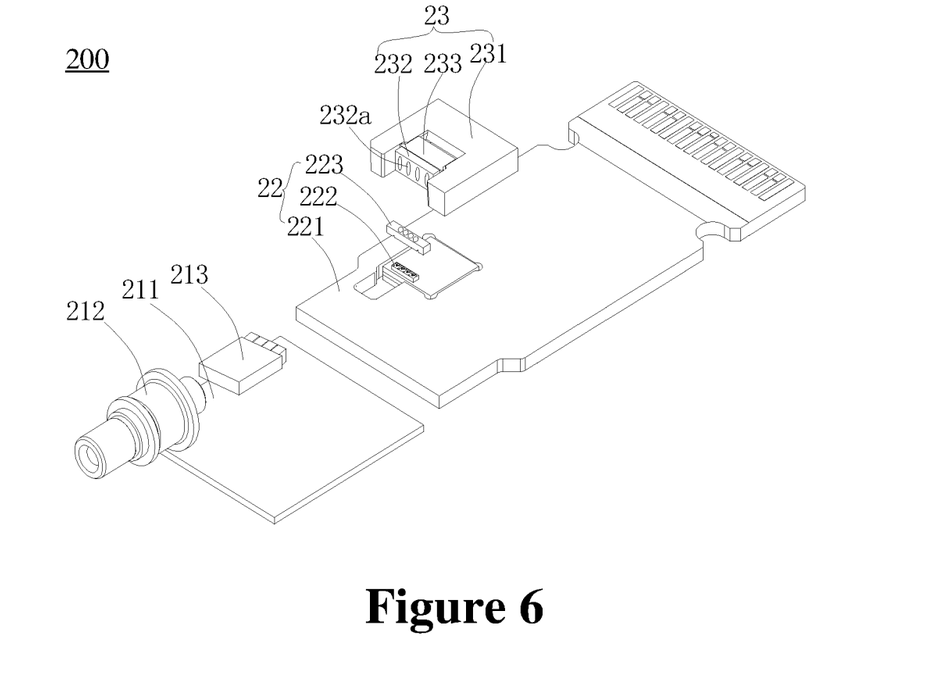
FIG. 6 is an exploded-view diagram illustrating a structure of a receiver optical assembly according to a second embodiment of the present disclosure.
Figure 7:
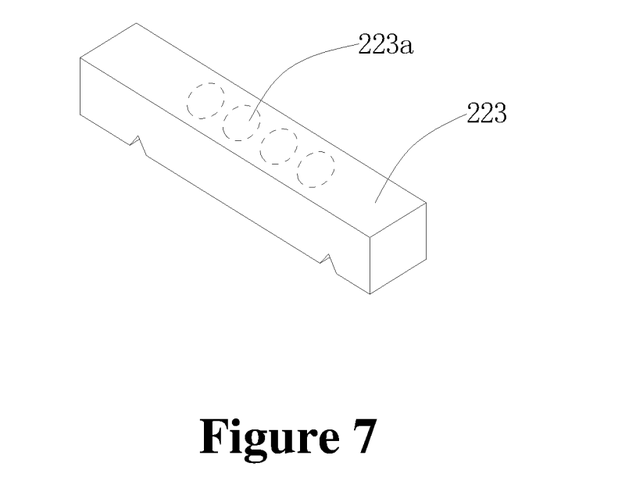
FIG. 7 is a structural diagram illustrating a focal reducing lens array according to the second embodiment.

FIG. 6 is an exploded-view diagram illustrating a structure of a receiver optical assembly 200 according to a second embodiment of the present disclosure. FIG. 7 is a structural diagram illustrating a focal reducing lens array according to the second embodiment. As illustrated in FIG. 6 and FIG. 7, the second example embodiment differs from the first example embodiment in that a focal reducing lens array 223 is added between the focusing lens 232 and the photodetector array 222. The focal reducing lenses 223a of the focal reducing lens array 223 have a one-to-one correspondence with the photodetectors of the photodetector array 222. The focal length of each focal reducing lens 223a is less than the focal length of the focusing lens 232, thus shortening the effective focal length of the focusing system (e.g., the combination of the focusing lens 232 and the focal reducing lens array 223). In this manner, even when the focusing lens 232 or the optical path shifter 233 deviates within a certain distance from the main optical axis, the focusing system can still converge the optical signal on a photosensitive area of the photodetector array 222, thus improving the degree of tolerance to the incident light angle and aperture deviation. As a result, the assembly tolerance of a focusing lens array, the optical path shifter, or other optical assemblies is relaxed, and the accuracy requirement for assembling an optical assembly is lowered, facilitating production and assembly, improving production efficiency, and lowering costs.

The focal reducing lens array 223 of this example embodiment is formed as a single structure. Alternatively, the focal reducing lens array 223 may also be made as a structure in which the focal reducing lenses 223a are separate from one another.

Example Embodiment 3

Figure 8:
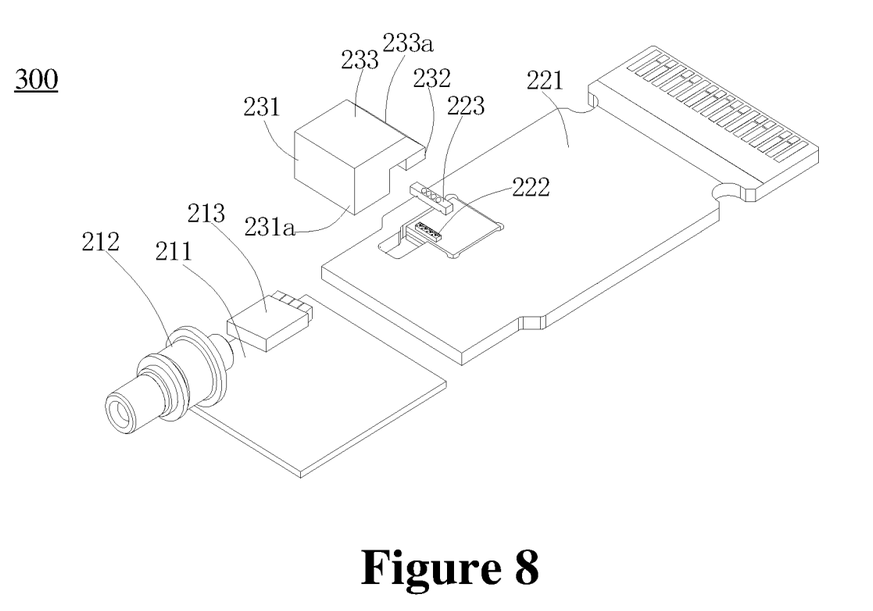
FIG. 8 is an exploded-view diagram illustrating a structure of a receiver optical assembly according to a third example embodiment of the present disclosure.

FIG. 8 is an exploded-view diagram illustrating a structure of a receiver optical assembly 300 according to a third embodiment of the present disclosure. As illustrated in FIG. 8, the third example embodiment differs from the second example embodiment in that the focusing lens 232 is disposed on the optical path after the optical path shifter 233. In the following example, a four-channel optical signal is discussed. Four single-channel optical signal beams are outputted from the wavelength division multiplexer 213 and enter, in parallel, the optical path shifter 233. After being reflected through the reflective surface 233a of the optical path shifter 233, the single-channel optical signal beams enter, in parallel, the coupling lenses 232a of the focusing lens 232. After passing through the coupling lenses 232a, each of the single-channel optical signal beams is focused on its respective photodetector in the photodetector array 222. Alternatively, each of the single-channel optical signal beams is focused on its respective photodetector after passing through the corresponding focal reducing lens of the focal reducing lens array 223. During actual use, the focusing lens 232 may be selected to be disposed on the optical path before or after the optical path shifter 233 in accordance with the needs of the optical path.

In this example embodiment, the optical path shifter 233 and the mounting block 231 are made as an integrated structure, and then the focusing lens 232 is adhered onto a light outputting end surface of the optical path shifter 233. Alternatively, the optical path shifter 233, the mounting block 231, and the focusing lens 232 may also be made as an integrated structure. Still alternatively, the shape of the mounting block is not limited and may also have other variations.

In each of the aforementioned example embodiments, the reflective surface 233a of the optical path shifter 233 and the optical axis of the focusing lens 232 have an angle of inclination, which may be arranged between 40° and 50°. An optimal angle may be approximately 45°, such as 43°, 48°, etc., so that the receiving system may have lower return loss.

Example Embodiment 4

The present disclosure further provides an assembly method for the aforementioned receiver optical assembly, the method including the following steps.

First, as illustrated in FIG. 3, the receiver optical port 212 and the wavelength division multiplexer 213 are installed on the optical platform 211 to form the first assembly 21. The photodetector array 222 is installed on the circuit board 221 to form the second assembly 22. The focusing lens 232 and the optical path shifter 233 are installed on the mounting block 231 to form the third assembly 23.

Next, the aforementioned first assembly 21 and second assembly 22 are installed inside the housing 10.

Then, the photodetector array 222 is covered with the aforementioned third assembly 23, and the position of the third assembly 23 is adjusted so that an optical signal outputted from the wavelength division multiplexer 213 is coupled to the photodetector array 222.

Finally, the third assembly 23 is fixed on the circuit board 221.

As illustrated in FIG. 6, in another example embodiment, the second assembly 22 further includes the focal reducing lens array 223 installed above the photodetector array 222. Thus, the step of installing the photodetector array 222 on the circuit board 221 to form the second assembly 22 further includes installing the focal reducing lens array 223 above the photodetector array 222. The focal reducing lenses of the focal reducing lens array 223 have a one-to-one correspondence with the photodetectors of the photodetector array 222. The focal length of each focal reducing lens is less than the focal length of the focusing lens 232.

The aforementioned method for fixing the third assembly 23 on the circuit board 221 includes connecting the circuit board 221 to the mounting block 231 of the third assembly 23 by means of glue and fixing the third assembly 23 on the circuit board 221 by means of the mounting block 231 so that the optical signal beams are coupled to the photodetectors of the photodetector array 222 after passing through the focusing lens 232 and the optical path shifter 233. Other methods for fixing and connecting may be used between the mounting block 231 and the circuit board 221.

None of the aforementioned steps for forming the first assembly 21, the second assembly 22, and the third assembly 23 restricts the order of the assembly sequence, and the three assemblies may be separately assembled at the same time into semi-finished products for later use. When the receiver optical assembly is being assembled, the first assembly 21 and the second assembly 22 are first installed in the housing in accordance with their preset positions, and then the front and back portions of the optical path are coupled by means of adjusting the third assembly 23, thus effectively improving coupling efficiency, enabling convenient adjustment of the position of the aforementioned assembly by means of grasping the mounting block, increasing the operability of the coupling and assembly, effectively improving assembly efficiency, and lowering costs.

In the embodiments of the present disclosure, a focusing lens and an optical path shifter are integrated to form an assembly, and the front and back portions of the optical path are coupled by means of adjusting this assembly, thus effectively improving coupling efficiency. In addition, a mounting block is added so that the position of the aforementioned assembly is conveniently adjusted by means of grasping the mounting block, thus increasing the operability of the coupling and assembly and effectively improving assembly efficiency.

The series of detailed descriptions above is only intended to provide specific descriptions of feasible embodiments of the present application. They are not to be construed as limiting the scope of protection for the present application; all equivalent embodiments or changes that are not detached from the techniques of the present application in essence should fall under the scope of protection of the present application.

What is claimed is:

1. A receiver optical assembly, comprising:
 a receiver optical port, an optical conductor, a focusing lens, and a photodetector arranged along an optical path,
 wherein a position of the focusing lens relative to the photodetector is adjustable while a position of the photodetector relative to the optical conductor is fixed, wherein the photodetector is included in a photodetector array including a plurality of photodetectors, the receiver optical assembly further comprising:

a focal reducing lens array disposed above the photodetector array, the focal reducing lens array including a plurality of focal reducing lenses having a one-to-one correspondence with the plurality of photodetectors of the photodetector array, the focal length of each focal reducing lens being less than the focal length of the focusing lens.

2. The receiver optical assembly of claim 1, wherein the focusing lens is disposed above the photodetector.

3. The receiver optical assembly of claim 1, wherein the optical conductor comprises a wavelength division multiplexer.

4. The receiver optical assembly of claim 3, wherein the receiver optical port is configured to receive incident light containing a multi-channel optical signal, the wavelength division multiplexer is configured to divide the incident light into a plurality of single-channel optical signal beams, and the focusing lens is configured to couple the single-channel optical signal beams to the photodetector after passing through the focusing lens, the focusing lens comprising a plurality of coupling lenses that are each positioned along the optical path of its respective single-channel optical signal beam.

5. The receiver optical assembly of claim 1, further comprising:

an optical platform on which the receiver optical port and the optical conductor are disposed;

a circuit board on which the photo detector is disposed; and a mounting block on which the focusing lens is disposed, wherein the mounting block is separated from the optical platform and separately fixed on the circuit board, and the focusing lens is disposed between the mounting block and the circuit board.

6. The receiver optical assembly of claim 5, further comprising:

an optical path shifter disposed on the mounting block.

7. The receiver optical assembly of claim 6, wherein the focusing lens, the optical path shifter, and the mounting block are formed as an integrated structure.

8. The receiver optical assembly of claim 5, wherein the mounting block comprises a supporting portion, the mounting block being fixed on the circuit board by means of the supporting portion.

9. The receiver optical assembly of claim 5, wherein the mounting block comprises a supporting portion, the supporting portion and the circuit board being fixed and connected by means of an adhesive.

10. The receiver optical assembly of claim 5, wherein the focusing lens is adhered onto the mounting block.

\* \* \* \* \*

UNITED STATES PATENT AND TRADEMARK OFFICE
CERTIFICATE OF CORRECTION

| | |
|---|---|
| PATENT NO. | : 11,762,153 B2 |
| APPLICATION NO. | : 17/399182 |
| DATED | : September 19, 2023 |
| INVENTOR(S) | : Long Chen et al. |

It is certified that error appears in the above-identified patent and that said Letters Patent is hereby corrected as shown below:

On the Title Page

Item (57) Abstract, Line 6, "on t the" should read as --on the--.

Signed and Sealed this
Sixteenth Day of January, 2024

*Katherine Kelly Vidal*

Katherine Kelly Vidal
*Director of the United States Patent and Trademark Office*